(12) United States Patent
Xu et al.

(10) Patent No.: US 11,892,351 B2
(45) Date of Patent: Feb. 6, 2024

(54) INSTRUMENT MONITORING AND CORRECTION

(71) Applicant: DATACOLOR INC., Lawrenceville, NJ (US)

(72) Inventors: Zhiling Xu, Princeton Junction, NJ (US); William Bishop, Bristol, PA (US)

(73) Assignee: DATACOLOR INC., Lawrenceville, NJ (US)

( * ) Notice: Subject to any disclaimer, the term of this patent is extended or adjusted under 35 U.S.C. 154(b) by 0 days.

(21) Appl. No.: 17/855,133

(22) Filed: Jun. 30, 2022

(65) Prior Publication Data

US 2024/0003742 A1    Jan. 4, 2024

(51) Int. Cl.
*G01J 3/28* (2006.01)
*G01J 3/02* (2006.01)

(52) U.S. Cl.
CPC ............... *G01J 3/28* (2013.01); *G01J 3/0297* (2013.01)

(58) Field of Classification Search
CPC ........ G01J 3/28; G01J 3/02; G01J 3/46; G01J 3/0297; G01N 21/00
See application file for complete search history.

(56) References Cited

U.S. PATENT DOCUMENTS

| | | | | |
|---|---|---|---|---|
| 4,093,991 A | * | 6/1978 | Christie, Jr. ......... | G01N 21/474 356/326 |
| 5,369,481 A | * | 11/1994 | Berg ...................... | G01N 21/55 356/319 |
| 6,665,078 B1 | * | 12/2003 | Meeks ................. | G01B 11/065 356/600 |
| 8,314,936 B2 | * | 11/2012 | Itoh ........................ | G01N 21/94 356/402 |

* cited by examiner

*Primary Examiner* — Abdullahi Nur
(74) *Attorney, Agent, or Firm* — LEASON ELLIS LLP

(57) ABSTRACT

In the disclosure provided herein, the described apparatus, systems and methods are directed to compensation of errors caused by the difference between the specular port and the sphere in a sphere-based color-measurement instrument, and improvement of the performance of the instrument. In one or more implementations, described approaches eliminate the need for hardware replacement, and therefore reduce costs associated with the operation of color measurement instruments.

15 Claims, 6 Drawing Sheets

INSTRUMENT MONITORING AND CORRECTION

FIELD OF THE INVENTION

The present invention is directed to apparatus, systems and methods for monitoring and adjusting the performance of a light or color measurement device.

BACKGROUND OF THE INVENTION

Sphere based color measurement instruments are widely used in industry. For example, Datacolor Inc. currently manufactures high performance color measurement devices, such as the DC1000 spectrophotometers. Such devices typically include both an illuminator, such as a lamp, and an integrating sphere or other measurement enclosure. These measurement instruments will typically include among other components, specular ports. Depending on the usage and the temperature and humidity of the working environment, both the specular port and the sphere will inevitably age. Eventually, measurements made using these sphere-based instruments will no longer provide accurate color measurements of a sample and it will need to be serviced or replaced.

When measuring a sample under specular included (SCI) configuration using sphere-based color measurements, the collected signal from the sample includes two parts: diffuse reflection from the sample and specular reflection from the sample. The light of the diffuse reflection is from the sphere, and the light of the specular reflection is from the specular port. Both the sphere light and the specular light come from the same lamp source. In an ideal situation, the inside surface of the sphere is uniform, and the reflectance of the specular port is the same as that of the sphere. However, a lot of factors may break the tie between the specular port and the sphere, such as the yellowing of the sphere, the contamination of the specular port, etc. Under those circumstances, the weight of the two parts in the total signal collected from the sample will change, and will impact the color performance of the instrument.

Further, to maintain good inter-instrument agreement, a test instrument usually needs to be profiled to a master instrument. In general, if the reflectances of a set of profiling standards measured with the test instrument are closer in geometric dependence to that of the master instrument, it will be easier to do the profiling. However, if the relationship between the reflectance of light off the specular port and sphere in the test instrument deviates too much from that of the master instrument, then profiling becomes difficult. For example, aging of the test instrument will cause this deviation and diminish the effectiveness of instrument profiling.

One way to solve the problem of instrument deviation is to replace parts (in most cases, the specular port) to make the test instrument closer to the master instrument in measurement result before profiling. However, this is time consuming and adds the cost of maintenance.

Therefore, there is a need in the industry to develop a simple method to compensate the error caused by the difference between the specular port and the sphere of a sphere-based color instrument and improve the performance of the instrument.

SUMMARY OF THE INVENTION

In the disclosure provided herein, the described apparatus, systems and methods are directed to compensation of errors caused by the difference between the specular port and the sphere in a sphere-based color-measurement instrument, and improve the performance of the instrument. In one or more implementations, described approaches eliminate the need for hardware replacement, and therefore reduce costs associated with the operation of color measurement instruments. Further, the described approaches allow for remote diagnosis and compensation of such deviation errors. In one or more implementations, the described approaches are used to reduce maintenance and service cost associated with sphere-based color measurement instruments.

In one particular implementation, a sphere-based instrument is provided. Here the sphere-based instrument is used to measure a color sample under specular included (SCI) configuration. One or more processors of the sphere-based instrument is configured to use measurement values from at least one dark sample such as a black ceramic tile to quantify the error caused by the deviation between the reflectance of the specular port and that of the inner surface of the sphere-based instrument. Here the processor is configured to determine a system coefficient that is independent of the dark sample. Using the same system coefficient, the error in measurements of samples under analysis caused by the same deviation are compensated. This compensation approach can be used both locally and remotely to improve the performance of the color measurement instrument and improve its service life.

In one particular implementation, a method is provided for compensating measurement error in a color measurement device. The method includes obtaining a color measurement value of a color sample using a sphere-based color measurement device and obtaining, using at least one processor, a wavelength dependent calibration factor. The method further includes obtaining, using at least one processor, a calibration or reference measurement value and calculating at least a corrected measurement value for the color measurement based on at least the calibration factor, the reference or calibration measurement value and the color measurement value. The method also includes outputting, using the at least one processor, the corrected measurement value to at least one of a display device or data storage device.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the apparatus, systems and methods described herein are directed towards monitoring, using existing infrastructure, the performance and quality of components used in color measurement devices.

Specifically, in one or more implementations, a method is provided to compensate the error caused by the difference between the specular port and the sphere of a sphere-based color instrument and improve the performance of the instrument.

It will be appreciated that sphere-based color measurement instruments, such as Datacolor's Spectro 1000 spectrophotometers can be utilized to conduct color measurements of a sample under specular included (SCI) configuration. Here, the light sensing element(s) of the spectrophotometer is configured to output a signal in response to illumination of a sample in this configuration.

Figure 2:
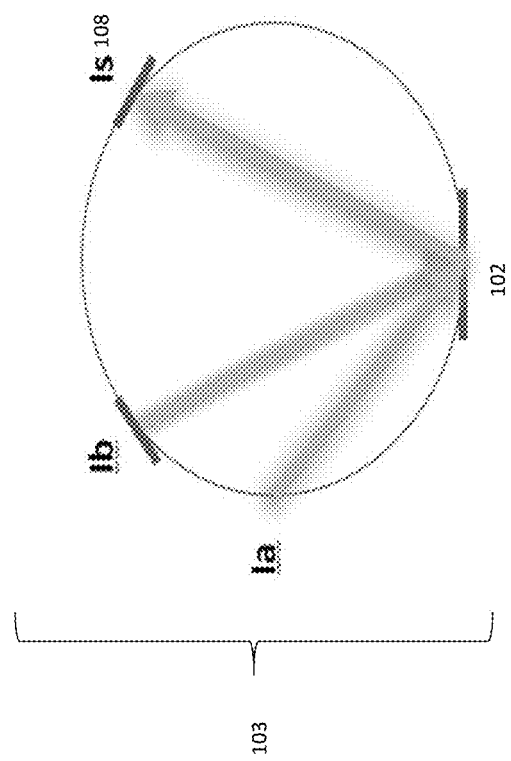
FIG. 2 details the light path in the color measurement instrument system as described herein.

As shown in FIG. 2, the outputted signal includes two parts: light that represents diffuse reflection from the sample and light that represents specular reflection from the sample. The light of the diffuse reflection is from the inner surface of the sphere-based color measurement device, and the light of the specular reflection is from a specular port located on the sphere-based spectrophotometer. Over time, the composition of the light measured by the light measurement device will change, decreasing the performance of the color measurement.

Therefore, a method, system and improved measurement apparatus have been developed that permits compensation for the aging of the interior sphere wall and specular port in a sphere-based color measurement instrument. The described improved measurement instrument is configured to implement a monitoring process or method that allows a local or remote operator to monitor the divergence between the two light components and compensate for this divergence to maintain color measurement accuracy.

In one particular implementation, a sphere-based instrument is provided. Here the sphere-based instrument is used to measure a color sample under a specular included (SCI) configuration. One or more processors of the sphere-based instrument is configured to use measurement values from at least one dark sample such as a black ceramic tile to quantify the error caused by the deviation between the reflectance of the specular port and that of the inner surface of the sphere-based instrument. Here the processor is configured to determine a system coefficient that is independent of the dark sample. Using the same system coefficient, the error in various samples caused by the same deviation is compensated. This compensation approach can be used both locally and remotely and can reduce maintenance and service cost.

Figure 1:
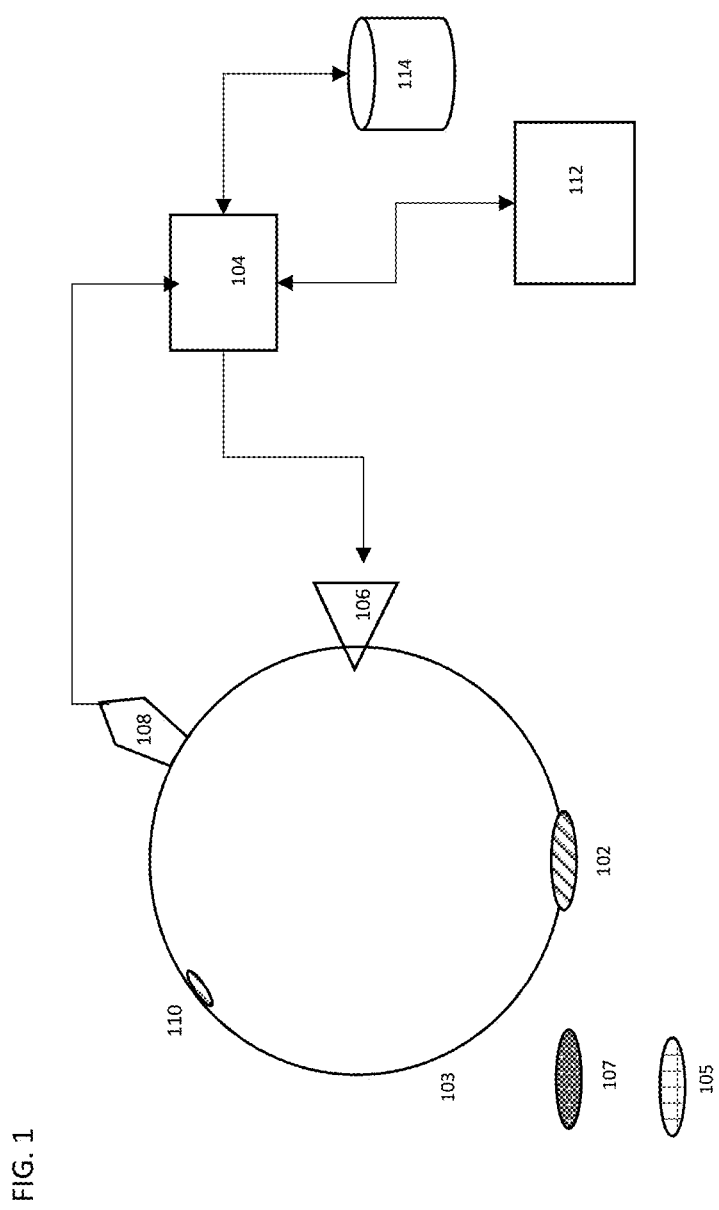
FIG. 1 details one or more components of the color measurement instrument system as described herein.

Referring now to the drawings, in which like reference numerals refer to like elements, FIG. 1 illustrates devices and components for obtaining color measurement data that interface over one or more data communication networks in accordance with one or more implementations of the present application.

As shown, FIG. 1 illustrates a color measurement instrument configuration arranged to obtain a measurement of a sample 102. In one or more particular implementations, the light measurement device includes a measurement enclosure 103. For example, as shown in FIG. 1, an integrating sphere is used to enclose various components provided herein. In one or more configurations, the measurement enclosure 103 includes one or more illuminators (106), as well as at least one sample channel sensor (108) and a specular port 110. In a further arrangement, the measurement enclosure 103 includes a reference channel sensor or other elements commonly used in the field of SCI configuration color measurements. In some configurations, the measurement enclosure 103 also includes baffles to prevent illumination from traveling directly from the illuminator 106 to the sample channel sensor 108 or the sample 102.

In one or more implementations, the sample 102 can be any type or form of physical article having color or spectral properties in need of analysis. For ease of reference and discussion, the foregoing descriptions the sample 102 refers to an article or material that has stable and uniform color and can be evaluated by currently available spectrophotometers.

In one or more further or alternative implementations, the sample 102 is a calibration article. Here, the calibration article has specific properties making it suitable for stable measurements over time. For instance, the sample 102 is a ceramic calibration tile. In one or more further implementations, the sample 102 is a white ceramic calibration tile. However, in alternative configurations, the sample 102 is a black calibration tile. Furthermore, the sample 102 can be any color calibration tile that shares specular similarities with a black calibration tile, such as dark grey or dark blue calibration tiles.

With continued reference to FIG. 1, the at least one (1) illuminator 106 is configured to illuminate the interior of the measurement enclosure 103. As noted, this illumination is not used to directly illuminate the sample 102. Instead, light that has reflected off the measurement enclosure 103 and the specular port 110 is then reflected off the sample 102. For example, as shown in FIG. 2, the at least one illuminator 106 is positioned such that the light that reflects off the sample is first reflected off the interior surface of the sphere or the specular port. Light that has been reflected off the sample 102 is then captured by the sample channel sensor 108.

In one or more implementations or embodiments, the one or more illuminator(s) is one or more commercially available lighting sources. For instance, the illuminator 106 is a single lighting element. However, in alternative implementations, the illuminator 106 is a collection of separate lighting devices that are configurable to produce a light with certain spectral power distributions. For instance, the illuminator 106 can, in one implementation, be one or more discrete light emitting elements, such as LEDs or OLEDs; fluorescent, halogen, xenon, neon, fluorescent, mercury, metal halide, HPS, or incandescent lamp; or other commonly known or understood lighting sources. In one arrangement, the illuminator 106 is one or more broad-band LEDs.

In one or more implementations, the illuminator 106 includes a lens, filter, screen, enclosure, or other elements (not shown) that are utilized in combination with the light source of the illuminator 106 to direct a beam of illumination, at a given wavelength, to the interior of the measurement enclosure 103. However, it will be appreciated any configuration of an illuminator 106 is envisioned so long as such configuration permits the evaluation and correction of measurements as described herein.

In a particular implementation, the illuminator 106 is operable or configurable by an internal processor or other control circuit. Alternatively, the illuminator 106 is operable or configurable by a remote processor or control device having one or more linkages or connections to the illuminator 106. As shown in FIG. 1, the illuminator 106 is directly connected to a processor or computer 104.

In one or more implementations the illuminator 106 is positioned relative to the sample 102 to ensure that light directly emitted by the illuminator 106 does not strike the sample 102. For example, baffles are used in one or more configurations to direct the light emitted by the illuminator 106 to the interior surface of the enclosure 103 and away from the sample 102. Once light is reflected off the interior surface of the measurement enclosure 103, or specular port 110, it strikes the surface of the sample 102.

Continuing with FIG. 1, light reflected off the sample 102 (such as a sample under analysis or a calibration tile) is captured or measured by a sample channel sensor 108. Here, the sample channel sensor 108 can be a color sensor or image capture device. For example, the sample channel sensor 108 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In one particular implementation, the sample channel sensor 108 is a multi-channel spectral sensor or similar device. In one or more implementations, the sample channel sensor 108 described herein, has 40 optical, NIR or other wavelength channels to evaluate a given wavelength range. However, other potential sensor configurations and wavelength channels and are understood and appreciated.

In a particular implementation, the sample channel sensor 108 is configured to generate an output signal upon light striking a light sensing portion thereof. By way of non-limiting example, the sample channel sensor 108 is configured to output signals in response to light that has been reflected off the sample 102 then strikes a light sensor or other sensor element integral or associated with sample channel sensor 108.

For instance, the sample channel sensor 108 is configured to generate a digital or analog signal that corresponds to the wavelength or wavelengths of light that are captured or received by the sample channel sensor 108. In one or more configurations, the sample channel sensor 108 are configured to output spectral information, RGB information, or another form of multi-wavelength data representative of light reflected off the sample 102.

As shown in FIG. 1 the sample channel sensor 108 is configured to transmit one or more measurements to a processing platform, such as processor 104. In one or more configurations, the at least one sample channel sensor 108 is directly connected to the processor 104. However, in one or more implementations, the sample sensor 108 is equipped or configured with network interfaces or protocols usable to communicate over a network, such as the internet. In this configuration, measurements made by the sample channel sensor 108 is sent to a remote processor for evaluation and analysis.

Alternatively, the sample channel sensor 108 is connected to one or more computers or processors, such as processor 104, using standard interfaces such as USB, FIREWIRE, Wi-Fi, Bluetooth, and other wired or wireless communication technologies suitable for the transmission of measurement data.

Figure 3:
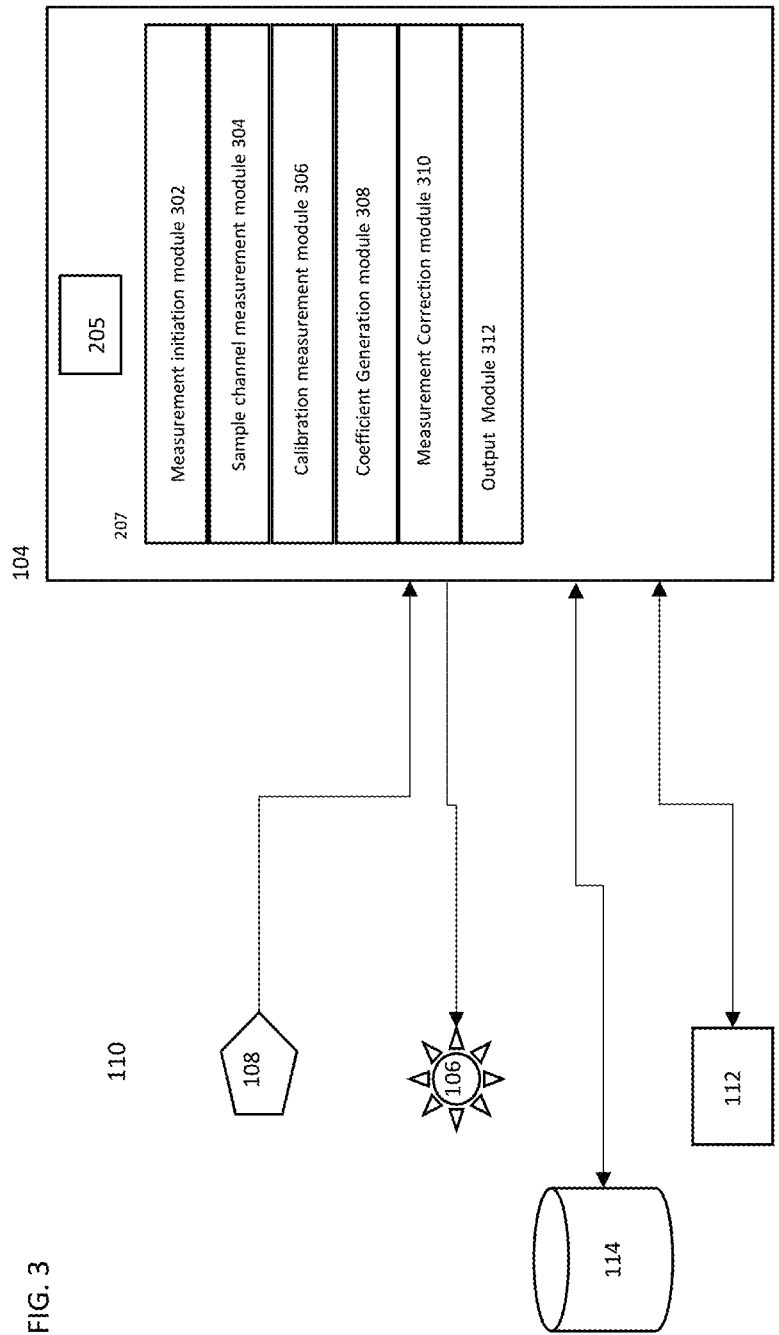
FIG. 3 details the module diagram of the color measurement instrument system as described herein.

The output signal generated by the sample channel sensor 108 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, including but not limited to functions, algorithms, classes and the like. In one arrangement, the software modules are stored as software 207 in the memory 205 of the processor 104, as shown in FIG. 3. Modules can, in some implementations, include discrete or specific hardware elements. In one implementation, the processor 104 is located within the same device as the measurement enclosure 103, such as within the form factor of a color measurement device. However, in another implementation, the processor 104 is remote or separate from the color measurement device and communicates over one or more communication linkages.

In one configuration, the processor 104 is configured through one or more software modules to generate, calculate, process, output or otherwise manipulate the output signals generated by the sample channel sensor 108.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 103 either directly, or through a communication linkage.

The processor 104 is configured to execute a commercially available or custom operating system, e.g., Microsoft WINDOWS, Apple OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

As shown in FIG. 1, the processor 104 is configured to store data either locally in one or more memory devices. Alternatively, the processor 104 is configured to store data, such as measurement data or processing results, in a local or remotely accessible database 114. The physical structure of the database 114 may be embodied as solid-state memory (e.g., ROM), hard disk drive systems, RAID, disk arrays, storage area networks ("SAN"), network attached storage ("NAS") and/or any other suitable system for storing computer data. In addition, the database 114 may comprise caches, including database caches and/or web caches. Programmatically, the database 114 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 114 includes the necessary hardware and software to enable the processor 104 to retrieve and store data within the database 114.

In one implementation, each element provided in FIG. 1 is configured to communicate with one another through one or more direct connections, such as through a common bus. Alternatively, each element is configured to communicate with the others through network connections or interfaces, such as a local area network LAN or data cable connection. In an alternative implementation, the sample channel sensor, processor 104, and database 114 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 114 and the sample channel sensor 108.

In one arrangement, the processor 104 communicates with a local or remote display device 112 to transmit, displaying or exchange data. In one arrangement, the display device 112 and processor 104 are incorporated into a single form factor, such as a color measurement device, such as a spectrometer, that includes an integrated display device. In an alternative configuration, the display device 112 is a remote computing platform such as a smartphone or computer that is configured with software to receive data generated and accessed by the processor 104. For example, the processor 104 is configured to send and receive data and instructions from a processor(s) of a remote computing device 112. This remote display device 112 includes one or more display devices configured to display data obtained from the processor 104. Furthermore, the display device 112 is also configured to send instructions to the processor 104. For example, where the processor 104 and the display device are wirelessly linked using a wireless protocol, instructions can be entered into the display device 112 that are executed by the processor. The display device 112 includes one or more associated input devices and/or hardware (not shown) that allow a user to access information, and to send commands and/or instructions to the processor 104. In one or more implementations, the display device 112 can include a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

Turning now to the overview of the operation of the system described in FIGS. 3 and 4, the processor 104 is configured to implement or evaluate the output of the sample channel sensor 108 to compensate for the deviation between the reflectance of the specular port and that of the sphere.

With particular reference to FIGS. 3 and 4, a process and method for compensating measurement error in a color measurement device is provided. The approach described includes measuring a color measurement value of a color sample 102 using a sphere-based color measurement device and obtaining, using at least one processor, a calibration factor. The method further includes obtaining, using at least one processor, a reference measurement value and calculating, at least a corrected measurement value for the color measurement based on at least the calibration factor, reference measurement value and the color measurement value. The method also includes outputting, using the at least one processor, the corrected measurement value to at least one display device or data storage device.

While the foregoing implementations are directed to sphere-based color measurement instruments, it will be understood and appreciated that any enclosure-based color measurement instrument that has characteristics substantially similar to an integrating sphere-based color measurement device is also understood and appreciated.

As further described herein, the described error compensation process can be carried out during routine measurements of samples under analysis using an enclosure-based color measurement device. It will be appreciated that the foregoing examples describe obtaining, generating, and using a wavelength dependent system calibration value to correct measurements made using the enclosure-based color measurement device. However, it is understood that the foregoing examples do not preclude undertaking analysis of signals that include multiple wavelengths.

Figure 4A:
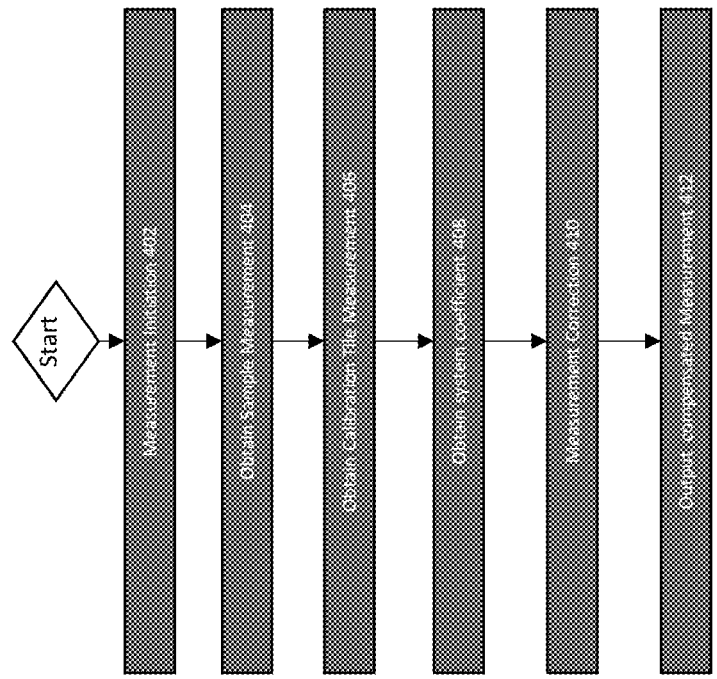
FIG. 4A provides a flow diagram of the measurement process described herein.
Figure 4B:
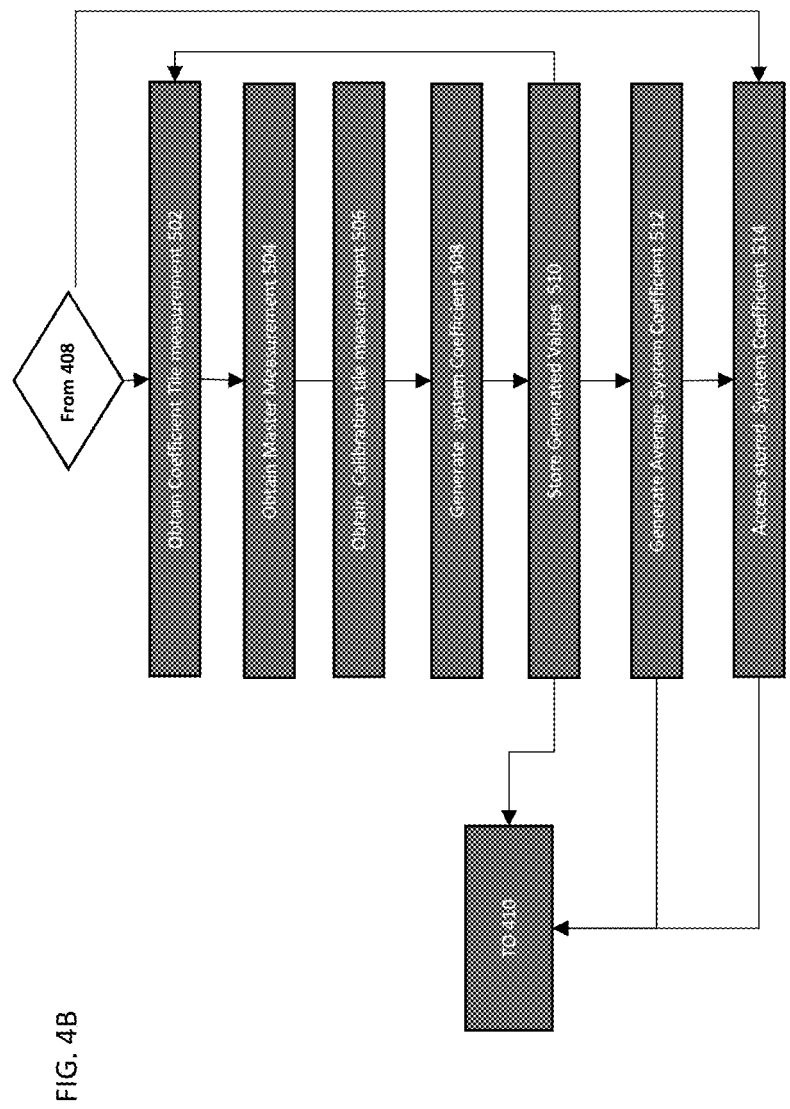
FIG. 4B provides a flow diagram of the measurement process described herein.

As shown in FIG. 4A, a color measurement process or procedure is initiated by the enclosure-based color measurement device. In one or more implementations, as part of the color measurement process, the color measurement device collects one or more measurements of a sample 102 using at least an illuminant 106 and a sample channel sensor 108.

In one or more implementations, a processor of the color measurement device (such as but not limited to processor 104) is configured by a measurement initiation module 302 to initiate a color measurement process, as shown in step 402. In one particular implementation, the measurement initiation module 302 configures the processor 104 to activate the illuminator 106 to illuminate the interior of the measurement enclosure. By way of further implementations, the measurement initiation module 302 generates a signal that is sent to the illuminator 106 that causes the illuminator to activate.

Turning now to step 404, the processor 104 is configured by a sample channel measurement module 304. The sample channel measurement module 304 configures the processor 104 to receive a signal generated by the sample channel sensor 108 in response to the illumination generated by the illuminator 106. For example, the processor 104 is configured to receive and store within a memory (such as memory 205), the signal generated by the sample channel sensor 108. Here the signal generated by the sample channel sensor 108 is the output generated when light reflected off the sample 102 strikes the sample channel sensor 108.

As shown in step 406, the processor 104 is configured by a calibration tile measurement module 306. The calibration tile measurement module 306 configures the processor 104 to receive a signal generated by the sample channel sensor 108 in response to the illumination generated by the illuminator 106. For example, a user or operator of the color measurement instrument replaces the sample 102 with a calibration tile (105) such that light from the illuminator is reflected from the calibration tile 105 to the sample channel sensor 108. The processor 104 is configured to receive and store within a memory (such as memory 205), the signal generated by the sample channel sensor 108 when a calibration tile 105 is placed within the sample port of the color measurement enclosure 103. Here, the calibration tile 105 is a white calibration tile that has known color properties.

Once the measurement values for the sample 102 and the calibration tile 105 have been obtained and stored by the processor 104, the measurement value for the sample 102 is adjusted or compensated using a system coefficient that takes into account the deviation between the reflectance of the specular port and that of the inner surface of the sphere. It will be understood and appreciated that the following illustration of a derivation of the system coefficient is for exemplary purposes. Alternative configurations and processes can be utilized to obtain the same system coefficient and the inventors appreciate and understand such alternative approaches.

By way of ease of continued explanation, the following list of variables can be utilized to explain the derivation of the system coefficient:

- $I_a(\lambda)$: light from the sphere to the sample 102, and received by the sample channel sensor 108 (see FIG. 2);
- $I_b(\lambda)$: light from the specular port to the sample 102, and received by the sample channel sensor 108 (See FIG. 2);
- $I_s(\lambda)$: light received by the sample channel sensor (See FIG. 2);
- $I_0(\lambda)$: total power of the lamp source (here, the illuminator 106);
- $R_a(\lambda)$: reflectance of the sphere (the inner surface of the measurement enclosure 103), typically diffuse reflectance, but can also be other types of reflectance, depending on the system design;
- $R_b(\lambda)$: reflectance of the specular port, typically diffuse reflectance, but can also be other types of reflectance, depending on the system design;
- $R_m(\lambda)$: total measured reflectance of the measurement sample;
- $R_{md}(\lambda)$: diffuse reflectance of the measurement sample;
- $R_g(\lambda)$: specular reflectance of the measurement sample;
- $R_w(\lambda)$: total reflectance of the white calibration tile.
- $R_{wd}(\lambda)$: diffuse reflectance of the white calibration tile.
- $R_k(\lambda)$: total reflectance of a black tile.
- $R_{kd}(\lambda)$: diffuse reflectance of a black tile.

More specifically, the above variables can be categorized according to their use in the correction process described herein.

Category 1: Measurements by a trusted instrument on a transfer-standard sample and taken as standard corrected values of current measurements.

- $R_{k0}(\lambda)$: total corrected reflectance of the black tile.
- $R_{w0}(\lambda)$ total corrected reflectance of the white calibration tile (which, by definition, is the same as the measured reflectance $R_w(\lambda)$).
- $R_{m0}(\lambda)$: total corrected reflectance of the measurement sample—to be put in the "solve" state, driven by the correction algorithm discussed here.

Category 2: Can be measured or inferred from normal operation of instrument.

- $I_{sm}(\lambda)$: total signal collected at the sample port
- $R_m(\lambda)$: total measured reflectance of the measurement sample;
- $R_w(\lambda)$: total measured reflectance of the white calibration tile.
- $R_k(\lambda)$: total measured reflectance of the black tile.
- $\beta$: internal system parameter.

Category 3: Cannot be measured or inferred from normal operation of instrument.

- $I_0(\lambda)$: total power of the lamp source;
- $I_a(\lambda)$: light from the sphere to the sample, and received by the sample channel sensor;
- $I_b(\lambda)$: light from the specular port to the sample, and received by the sample channel sensor;
- $R_a(\lambda)$: reflectance of the sphere, typically diffuse reflectance, but can also be other types of reflectance, depending on the system design;
- $R_b(\lambda)$: reflectance of the specular port, typically diffuse reflectance, but can also be other types of reflectance, depending on the system design;
- $R_{wd}(\lambda)$: diffuse reflectance of the white calibration tile.
- $R_{kd}(\lambda)$: diffuse reflectance of the black tile.
- $R_{md}(\lambda)$: diffuse reflectance of the measurement sample;
- $R_g(\lambda)$: specular reflectance of the measurement sample;
- $k_a(\lambda)$ and $k_b(\lambda)$: coefficients determined by the optical system path corresponding to the sphere and specular port, respectively.

Now, turning the following exemplary description, for a glossy measurement sample (such as a BCRA tile), $$I_a(\lambda) = k_a(\lambda) R_a(\lambda) I_0(\lambda) R_{md}(\lambda) \tag{1}$$

$$I_b(\lambda) = k_b(\lambda) R_b(\lambda) I_0(\lambda) R_g(\lambda) \tag{2}$$

and $$I_{sm}(\lambda) = I_a(\lambda) + I_b(\lambda) \tag{3}$$

Where $I_{sm}(\lambda)$ is the total signal collected at the sample port, $k_a(\lambda)$ and $k_b(\lambda)$ are coefficients determined by the optical system. It will be appreciated that these coefficients are not related to the reflectance of the sphere, the reflectance of the specular port, the lamp (illuminator 106) spectral power distribution, nor the reflectance of the sample. For a white tile calibration, $$I_{sw}(\lambda) = I_{aw}(\lambda) + I_{bw}(\lambda) = k_a(\lambda) R_a(\lambda) I_0(\lambda) R_{wd}(\lambda) + k_b(\lambda) R_b(\lambda) I_0(\lambda) R_g(\lambda) \tag{4}$$

In one particular implementation, it can be assumed that the measured signal is 0 when performing a black trap calibration. From the measured raw intensity data obtained by the color channel sensor 108, the reflectance of the measurement sample to that of the white tile can be related according to the following equation:

$$R_m(\lambda) = \frac{I_{sm}(\lambda)}{I_{sw}(\lambda)} R_w(\lambda) \tag{5}$$

where $R_w(\lambda)$ is the known reflectance of the calibration white tile 105. Considering equations (1)~(5), it is possible to recharacterize $R_m(\lambda)$ as:

$$R_m(\lambda) = \frac{k_a(\lambda) R_a(\lambda) I_0(\lambda) R_{md}(\lambda) + k_b(\lambda) R_b(\lambda) I_0(\lambda) R_g(\lambda)}{k_a(\lambda) R_a(\lambda) I_0(\lambda) R_{wd}(\lambda) + k_b(\lambda) R_b(\lambda) I_0(\lambda) R_g(\lambda)} R_w(\lambda) \tag{6}$$

For ease of illustration only, the foregoing explanation will omit $\lambda$ in the following discussion. However, it should be appreciated that the following equations are wavelength dependent. Equation (6) can be written as $$R_m = \frac{\frac{k_a}{k_b}\frac{R_a}{R_b}R_{md} + R_g}{\frac{k_a}{k_b}\frac{R_a}{R_b}R_{wd} + R_g}R_w \quad (7)$$

Let equation $$k = \frac{k_a}{k_b},$$

(7) becomes $$R_m = \frac{k\frac{R_a}{R_b}R_{md} + R_g}{k\frac{R_a}{R_b}R_{wd} + R_g}R_w \quad (8)$$

Where an instrument has low deviation between the reflectance of the specular port and the reflectance of the inner sphere surface, such as in a standard master instrument, $$\frac{R_a}{R_b} = 1.$$

Therefore, Equation (8) can be rewritten as:

$$R_m = \frac{kR_{md} + R_g}{kR_{wd} + R_g}R_w \quad (9)$$

It will be appreciated that in a simplified class of measured samples, there are only two reflectance components, specular and diffuse, and the specular component is the same for all the samples including the white and black tiles. For that class of reflectances, $R_m = R_{md} + R_g$, $R_w = R_{wd} + R_g$, so it is possible to rewrite Equation (9) as:

$$R_m = \frac{k(R_m - R_g) + R_g}{k(R_w - R_g) + R_g}R_w \quad (10)$$

and this requires k=1, whereupon Equation (8) becomes:

$$R_m = \frac{\frac{R_a}{R_b}R_{md} + R_g}{\frac{R_a}{R_b}R_{wd} + R_g}R_w \quad (11)$$

Any change of $$\frac{R_a}{R_b}$$

will result in a perturbation of $R_m$.

Knowing the impact of the $$\frac{R_a}{R_b}$$

ratio, it is possible to derive a system coefficient that functions to compensate for the measurement error. Assume $R_{m0}$ is the true reflectance of the sample (such as sample 102) in SCI mode, and $R_m$ is the actually measured reflectance. The error is:

$$\delta = R_m - R_{m0} \quad (12)$$

Considering Equation (11), and $R_{m0}$ is defined when $$\frac{R_a}{R_b} = 1,$$

equation 12 can be rewritten as:

$$\delta = \frac{\frac{R_a}{R_b}R_{md} + R_g}{\frac{R_a}{R_b}R_{wd} + R_g}R_w - \frac{R_{md} + R_g}{R_{wd} + R_g}R_w = \frac{(R_{wd} - R_{md})\left(1 - \frac{R_a}{R_b}\right)R_g}{\left(\frac{R_a}{R_b}R_{wd} + R_g\right)(R_{wd} + R_g)}R_w \quad (13)$$

Because it can be assumed that any two of the samples in the chosen class share the same specular reflectance, $R_{wd} - R_{md} = R_w - R_m$, so equation (13) can be written as $$\delta = \beta(R_w - R_m) \quad (14)$$

where $$\beta = \frac{\left(1 - \frac{R_a}{R_b}\right)R_g}{\left(\frac{R_a}{R_b}R_{wd} + R_g\right)(R_{wd} + R_g)}R_w$$

is a coefficient determined by the system and the surface properties of the sample, but not by the sample diffuse reflectance. For a black tile, equation (14) becomes therefore, $$\delta_k = R_k - R_{k0} = \beta(R_w - R_k) \quad (15)$$

$$\beta = (R_k - R_{k0})/(R_w - R_k) \quad (16)$$

As shown in step 408, the processor 104 is configured by a coefficient generation module 308 to derive or access the system coefficient value. For example, and turning to the process outlined in FIG. 4B, step 502 includes obtaining a measurement of a system coefficient tile 107 using the color measurement instrument. Using the measured value for the system coefficient tile 107, the processor 104 is then configured by the coefficient generation module 308 to generate or calculate wavelength dependent coefficients β using equation 16.

For example, the coefficient generation module 308 includes one or more sub-modules that configure the processor to obtain a signal generated by the sample channel sensor 108 in response to the illumination of a system coefficient tile 107. For example, the processor 104 is configured to receive and store within a memory (such as memory 205), the signal generated by the sample channel sensor 108 when a system coefficient tile 107 is placed within the sample port of the color measurement enclosure 103. In one particular implementation, the system coefficient tile 107 is a black calibration tile that has known color properties. It will be appreciated that in one or more implementations, β can be determined with a black tile. However, in alternative configurations, the system coefficient generation step 408 can be carried using other dark color tiles of the same specular class as the black tile, such as dark gray or deep blue.

In Equation 16, $R_{k0}$ cannot be directly measured by the sample channel sensor 108. Therefore, the coefficient generation module 308 is configured to access a stored value for $R_{k0}$, as shown in step 504. For instance, the processor 104 is configured by one or more submodules of the coefficient generation module 308 to access the value from $R_{k0}$ from a local or remote data store. In one or more implementations, the value for $R_{k0}$ is obtained using a master instrument. This master instrument is used to measure the same black tile. Here, it is established that the master instrument is sufficiently calibrated to provide an accurate value for $R_{k0}$. Once this master measurement has been obtained, it can be stored to a remotely accessible storage device, such as a cloud server or other network accessible storage device. Alternatively, the master measurement value can be provided directly to the color measurement using a disk drive or other file transfer mechanism. In yet a further implementation, the master measurement values obtained in step 504 can be manually input to the processor 104 by a user.

In Equation 16, $R_w$ is the SCI reflectance of the white calibration tile (obtained in step 406). As shown in step 506, one or more submodules of the coefficient generation module 308 configures the processor 104 to access the calibration tile value obtained in step 406 and use those accessed values. Alternatively, a new measurement of a white calibration tile can be obtained as part of step 506. In this implementation, the process of obtaining a new measurement of a white calibration tile is the same as the process provided in step 406.

As shown in step 508, once the values for the system coefficient tile, the master measurement values and the calibration tile have been obtained, the wavelength dependent coefficient is generated. For example, the processor 104 is configured by one or more submodules of the coefficient generation module 308 to calculate the system coefficient according to Equation 16.

As shown in step 510, once the system coefficient value has been generated, it can be used to correct the measurements made of the sample in question. The sample in question can be any sample with similar surface properties to the calibration tile.

In one or more implementations, the system coefficient generation step 408 can be carried out multiple times so as to obtain a plurality of system coefficient values. The average of several of the individual results, calculated as shown in step 512, can then be used to correct the measurement errors. For example, the processor 104 is configured by one or more submodules of the coefficient generation module 308 to calculate the average value for β and provide this average measurement value for use in correcting the measurement of the sample. Measurement averaging can be used to reduce the measurement uncertainty from a single measurement and thereby reduce error caused by measurement noise.

While the coefficient generation module 308 can configure the processor to generate a system coefficient according to the process outlined in steps 502-512, the processor 104 can also be configured by one or more submodules of the coefficient generation module 308 to access a prior generated system coefficient for use. For example, where a batch of color measurements are taken of different samples, one or more submodules of the coefficient generation module 308 configures the processor 104 to access a stored value for the system coefficient, as shown in step 514 of FIG. 4B. Such an approach allows the system to avoid implementing the coefficient generation steps 502-510 each time a color measurement of a sample 102 is made.

Returning to FIG. 4A, step 410 details that the processor 104 is configured by a measurement correction module 310. Here, the measurement correction module 310 configures the processor 104 to calculate a corrected value for the measurement obtained of sample 102 in step 402 using the system coefficient value obtained in step 408. In one particular implementation, the measurement correction module 310 configures the processor 104 to correct the measurement error and get the proper reflectance of the sample 102 according to the following:

$$R_{m0} = R_m - \beta(R_w - R_m) \quad (17)$$

As such, the measurement correction module 310 configures the processor 104 to compensate the measurement error caused by the difference between the specular port reflectances and the sphere reflectances.

In one or more implementations, the compensated measurement value calculated in step 410 is presented to a user of the measurement instrument. For example, the processor 104 is configured by an output module 312 to output the compensated measurement values for a given sample, shown in step 412. For instance, the output module 312 configures the processor 104 to output the corrected measurements to the remote computing device 112. In another implementation, the output module 312 configures the processor 104 to output the corrected measurements to a data storage device or database, such as database 114.

As outlined herein, the process of generating a system coefficient and using this generated value to improve measurement outcomes permits and enables remote diagnosis of a color measurement device without needing to perform direct inspections of the specular port. In order to implement a remote diagnosis of a color measurement instrument, a minimum of one black tile is needed. In one or more implementations, a kit comprising the color measurement device, and the black tile are provided. Here, the black tile can be provided with the color measurement instrument when it leaves the manufacturing site, or a black tile can be provided to the user at a later date. In both instances, the black (or other color tile) has a known reference reflectance spectral value that was measured with a master instrument. During remote diagnosis, the same black tile will be measured with the color instrument to be serviced, and the measured spectral data will be compared with the reference data, and a new set of wavelength dependent coefficients (β can be obtained according to equation (16). The new coefficients can be stored in a data storage device and be used to replace older system coefficient values, and the color performance of the instrument can be improved.

Figure 5:
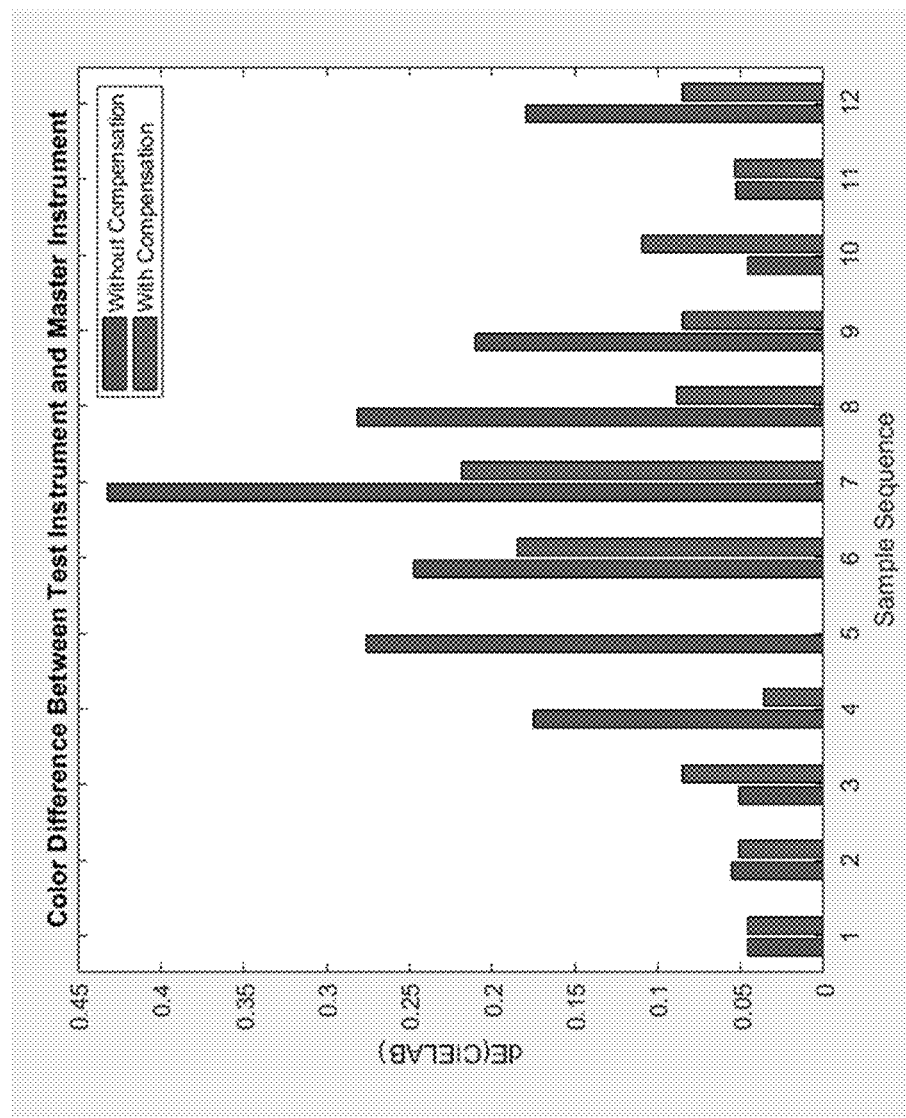
FIG. 5 provides a chart detailing the performance of a color measurement instrument, with and without the error compensation approach as described herein.

Turning to FIG. 5, the results of implementing the error correction process on color measurement are provided. FIG. 5 details the color difference of 12 BCRA tiles between a color measurement instrument and the master instrument. As shown, a test instrument that is configured to implement the measurement error compensation process described provides improved performance relative to the master instrument compared to a test instrument that does not implement the measurement error compensation process described.

As noted, for an instrument in the field, the sphere and the specular port of a color measurement device will age over time, and the reflectance ratio will change. Typically, a hardware change (e.g., replacing the specular port or the sphere) is needed to maintain the color performance, and a service trip or full-instrument shipment will be required. The described error compensation method enables remote diagnosis and adjustment of the color measurement instrument. By providing remote diagnosis and adjustment functionality to the color measurement device, the overall performance of the color measurement device is improved relative to the art. Furthermore, such an approach is effective in reducing the service cost associated with maintaining color measurement devices.

It will be appreciated that the described process of generating and applying wavelength dependent coefficients β to correct sample measurements provides higher improvements for glossier sample types. For less glossy samples, the impact of specular port/sphere deviation is less, and the compensation is less effective. However, once the color measurement instrument has been configured to compensate glossy samples, there is no noticeable negative impact on matt samples. Therefore, this method can be used in various types of samples and can achieve overall better color performance.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and reference were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method of compensating for measurement error in a color measurement device, the method comprising:
   measuring a total measured reflectance value of a color sample using a sphere-based color measurement device;
   obtaining, using at least one processor, a wavelength dependent calibration factor;
   obtaining, using at least one processor, a reference measurement value;
   calculating, using at least one processor, at least a corrected measurement value for the color measurement based on at least the calibration factor, reference measurement value and the color measurement value; and
   outputting, using the at least one processor, the corrected measurement value to at one or a display device or data storage device.

2. The method of claim 1, wherein the reference measurement value is obtained by measuring, using the sphere-based color measurement device, a color reference object.

3. The method of claim 2, wherein the color reference object is a white calibration tile.

4. The method of claim 1, wherein the corrected measurement value is calculated according to:

$$R_{m0} = R_m - \beta(R_w - R_m)$$

wherein $R_m$ is the total measured reflectance of the color sample, and $R_w$ is the reference measurement value, and $\beta$ is the wavelength dependent calibration factor.

5. The method of claim 1 wherein the calibration factor is calculated using at least one measurement made by the sphere-based color measurement device of at least one calibration standard.

6. The method of claim 5, wherein the wavelength dependent calibration factor is calculated according to:

$$\beta=(R_k-R_{k0})/(R_w-R_k)$$

where $R_k$ is the total measured reflectance of the at least one calibration standard, $R_w$ is the reference measurement value and $R_{k0}$ is a master instrument measurement value of a master calibration standard.

7. The method of claim 6, wherein the master calibration standard is the least one calibration standard.

8. The method of claim 6, wherein $R_{k0}$ is obtained from a data storage device remote from the sphere-based color measurement device.

9. The method of claim 6, wherein $R_{k0}$ is calculated by measuring the master calibration standard using a reference color measurement instrument.

10. The method of claim 6, wherein $R_{k0}$ is calculated by obtaining a plurality of measurements of the at least one calibration standard and calculating an average reflectance value thereof.

11. The method of claim 6, wherein the at least one calibration standard is a black calibration tile.

12. The method of claim 6, wherein the at least one calibration standard is a calibration tile having the same specular class as a black calibration tile.

13. The method of claim 6, wherein the wavelength dependent calibration factor is calculated by obtaining a plurality of wavelength dependent calibration factors and calculating average wavelength dependent calibration factor as the wavelength dependent calibration factor.

14. A color measurement device, the color measurement device comprising:
   an integrating sphere having a specular port, at least one color measurement sensor and an illuminator;
   a processor configured by code executing therein to:
      cause the illuminator to illuminate the interior of the integrating sphere,
      receive at least one color measurement value generated by the at least one color measurement sensor when a sample is present in a sample port of the integrating sphere and the illuminator is configured to illuminate the integrating sphere;
      obtain a reference measurement value;
      obtain a wavelength dependent calibration factor;
      calculate at least a corrected measurement value for the color measurement based on at least the calibration factor, reference measurement value and the color measurement value; and
      output, using the at least one processor, the corrected measurement value to at least one display device or data storage device.

15. The color measurement device of claim 14, wherein the corrected measurement value is calculated according to:

$$R_{m0}=R_m-\beta(R_w-R_m)$$

wherein $R_m$ is the total measured reflectance of the color sample, and $R_w$ is the reference measurement value, and $\beta$ is the wavelength dependent calibration factor.

* * * * *